(12) United States Patent
Aukzemas

(10) Patent No.: US 7,344,345 B2
(45) Date of Patent: Mar. 18, 2008

(54) CAPTIVE SHOULDER NUT HAVING SPRING TIE-DOWN

(75) Inventor: Thomas V. Aukzemas, Wilmington, DE (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 10/855,538

(22) Filed: May 27, 2004

(65) Prior Publication Data

US 2005/0265803 A1   Dec. 1, 2005

(51) Int. Cl.
   *F16B 43/00*   (2006.01)
(52) U.S. Cl. .................. 411/372; 411/361; 411/352; 411/999; 411/969; 411/183
(58) Field of Classification Search ........ 411/361–362, 411/372, 351, 352, 353, 999, 969, 183
See application file for complete search history.

(56) References Cited

U.S. PATENT DOCUMENTS

| | | | | |
|---|---|---|---|---|
| 1,472,405 A | * | 10/1923 | Amberton | 285/2 |
| 1,570,148 A | * | 1/1926 | Herr | 411/133 |
| 1,630,958 A | * | 5/1927 | Mauch | 411/252 |
| 1,854,730 A | | 4/1932 | Bell | |
| 1,997,821 A | * | 4/1935 | Gzupkaytie | 301/35.624 |
| 2,018,346 A | | 10/1935 | Busby | |
| 2,101,938 A | * | 12/1937 | Giberson | 285/94 |
| 2,151,255 A | * | 3/1939 | Witchger | 411/427 |
| 2,201,793 A | | 5/1940 | Sanborn | |
| 2,235,530 A | * | 3/1941 | Mercer | 411/347 |
| 2,345,650 A | * | 4/1944 | Attwood | 403/21 |
| 2,430,884 A | * | 11/1947 | Noyes | 411/197 |
| 2,464,133 A | * | 3/1949 | Herbert | 411/432 |
| 2,672,659 A | * | 3/1954 | Becker | 403/20 |
| 2,737,222 A | * | 3/1956 | Becker | 411/105 |
| 2,991,904 A | * | 7/1961 | Carideo | 220/231 |
| 3,093,222 A | * | 6/1963 | Christoffersen et al. | 403/408.1 |
| 3,099,057 A | * | 7/1963 | Cook | 24/713.6 |
| 3,204,680 A | | 9/1965 | Barry | |
| 3,209,806 A | * | 10/1965 | Currier et al. | 411/361 |
| 3,250,559 A | * | 5/1966 | Sommerfeld | 292/251 |

(Continued)

FOREIGN PATENT DOCUMENTS

WO    WO 02/48557 A1    6/2002

OTHER PUBLICATIONS

Penn Engineering, "The Self-clinching Fastener Handbook", 2002, p. 15.*

(Continued)

*Primary Examiner*—Katherine Mitchell
(74) *Attorney, Agent, or Firm*—Paul & Paul

(57) ABSTRACT

A captive shoulder nut for a electronic module heat sink has a threaded nut portion and a tubular portion extending therefrom. A ramped section in the exterior wall of the tubular portion leads to a retaining groove adjacent the bottom face of the nut portion. A compression spring is slipped over the tubular portion to ride over the ramped section and be retained at one end in the retaining groove. The tubular portion is suitable to be inserted through a straight hole, whereof the inner diameter of the spring is larger than the hole. The free end of the tubular portion is suitable to be flared to a larger diameter than the hole, thereby establishing a captivation.

23 Claims, 5 Drawing Sheets

U.S. PATENT DOCUMENTS

| | | | |
|---|---|---|---|
| 3,263,728 A * | 8/1966 | Lynch | 411/349 |
| 3,295,578 A * | 1/1967 | Maloof | 411/105 |
| 3,437,119 A * | 4/1969 | Dey | 411/349 |
| 3,451,668 A * | 6/1969 | Robinson | 269/93 |
| 3,461,769 A * | 8/1969 | Brosseit | 411/385 |
| 3,465,803 A * | 9/1969 | Swanstrom et al. | 411/349 |
| 3,490,509 A * | 1/1970 | Otteson et al. | 411/350 |
| 3,502,130 A * | 3/1970 | Bulent | 411/361 |
| 3,505,921 A * | 4/1970 | Klaus | 411/34 |
| 3,589,423 A * | 6/1971 | Metz | 411/262 |
| 3,594,876 A * | 7/1971 | Gunther | 411/555 |
| 3,723,946 A * | 3/1973 | Weatherup et al. | 439/320 |
| 3,728,933 A * | 4/1973 | Grube | 411/5 |
| 3,816,010 A * | 6/1974 | DiRago | 403/157 |
| 3,843,080 A | 10/1974 | Imai et al. | |
| 3,847,422 A * | 11/1974 | Gulistan | 292/60 |
| 3,877,339 A * | 4/1975 | Muenchinger | 411/372 |
| 3,892,031 A * | 7/1975 | Bisbing | 29/437 |
| 3,912,411 A * | 10/1975 | Moffat | 403/259 |
| 4,088,355 A * | 5/1978 | Dey | 292/251 |
| 4,204,566 A * | 5/1980 | Kirrish et al. | 411/324 |
| 4,285,380 A * | 8/1981 | Gulistan | 411/103 |
| 4,464,091 A * | 8/1984 | Molina | 411/105 |
| 4,493,470 A * | 1/1985 | Engel | 248/503.1 |
| 4,557,653 A * | 12/1985 | Hill | 411/337 |
| D283,591 S * | 4/1986 | Swanstrom | D8/387 |
| 4,587,377 A * | 5/1986 | Rodseth | 174/16.3 |
| 4,655,658 A * | 4/1987 | Gulistan | 411/353 |
| 4,720,223 A * | 1/1988 | Neights et al. | 411/11 |
| 4,810,143 A * | 3/1989 | Muller | 411/181 |
| 4,828,441 A * | 5/1989 | Frasca | 411/183 |
| 4,863,326 A * | 9/1989 | Vickers | 411/105 |
| 4,911,592 A * | 3/1990 | Muller | 411/181 |
| 4,915,557 A * | 4/1990 | Stafford | 411/107 |
| 4,958,743 A * | 9/1990 | Hatton et al. | 220/288 |
| 5,042,880 A * | 8/1991 | Garuti et al. | 301/35.624 |
| 5,059,075 A * | 10/1991 | Kelly | 411/107 |
| 5,094,579 A | 3/1992 | Johnson | |
| 5,175,665 A * | 12/1992 | Pegg | 361/218 |
| 5,338,139 A * | 8/1994 | Swanstrom | 411/353 |
| 5,382,124 A * | 1/1995 | Frattarola | 411/352 |
| 5,384,940 A * | 1/1995 | Soule et al. | 24/453 |
| 5,393,183 A * | 2/1995 | Hinton | 411/432 |
| D357,176 S * | 4/1995 | Ernest et al. | D8/387 |
| 5,429,466 A * | 7/1995 | Nagayama | 411/179 |
| 5,452,979 A * | 9/1995 | Cosenza | 411/348 |
| 5,462,395 A | 10/1995 | Damm et al. | |
| 5,475,564 A | 12/1995 | Chiou | |
| 5,538,464 A * | 7/1996 | MacKay, Jr. | 451/342 |
| 5,544,992 A * | 8/1996 | Ciobanu et al. | 411/353 |
| 5,558,480 A | 9/1996 | Kazino et al. | |
| 5,611,654 A * | 3/1997 | Frattarola et al. | 411/432 |
| 5,638,258 A | 6/1997 | Lin | |
| 5,653,481 A * | 8/1997 | Alderman | 285/363 |
| 5,662,163 A | 9/1997 | Mira | |
| D391,844 S * | 3/1998 | Ropponen et al. | D8/382 |
| D392,179 S * | 3/1998 | Ropponen et al. | D8/387 |
| 5,730,210 A * | 3/1998 | Kou | 165/80.3 |
| 5,738,531 A | 4/1998 | Beaman et al. | |
| 5,743,692 A | 4/1998 | Schwarz | |
| 5,755,276 A | 5/1998 | Chiou | |
| 5,757,621 A * | 5/1998 | Patel | 361/719 |
| 5,779,288 A * | 7/1998 | Amelio | 292/251 |
| 5,828,553 A | 10/1998 | Chiou | |
| 5,845,673 A * | 12/1998 | Paul | 137/360 |
| 5,881,800 A | 3/1999 | Chung | |
| 5,903,434 A | 5/1999 | Chiou | |
| 5,999,402 A * | 12/1999 | Jeffries et al. | 361/687 |
| 6,025,994 A | 2/2000 | Chiou | |
| 6,055,159 A | 4/2000 | Sun | |
| 6,059,503 A | 5/2000 | Johnson | |
| 6,061,240 A * | 5/2000 | Butterbaugh et al. | 361/704 |
| 6,079,920 A | 6/2000 | Dispenza | |
| 6,095,738 A * | 8/2000 | Selle | 411/427 |
| 6,101,096 A | 8/2000 | MacGregor et al. | |
| 6,105,215 A | 8/2000 | Lee | |
| 6,112,378 A | 9/2000 | Lee | |
| 6,139,113 A * | 10/2000 | Seliga | 301/35.624 |
| 6,139,237 A * | 10/2000 | Nagayama | 411/181 |
| 6,164,980 A * | 12/2000 | Goodwin | 439/70 |
| 6,179,697 B1 * | 1/2001 | Shibai | 451/359 |
| 6,182,958 B1 | 2/2001 | Sidone et al. | |
| 6,196,849 B1 * | 3/2001 | Goodwin | 439/71 |
| 6,238,155 B1 * | 5/2001 | Aukzemas et al. | 411/107 |
| 6,246,584 B1 | 6/2001 | Lee et al. | |
| 6,250,375 B1 | 6/2001 | Lee et al. | |
| 6,252,768 B1 * | 6/2001 | Lin | 361/687 |
| 6,280,131 B1 * | 8/2001 | Ellis et al. | 411/353 |
| 6,282,761 B1 | 9/2001 | Bewley et al. | |
| 6,295,203 B1 | 9/2001 | Lo | |
| 6,307,748 B1 | 10/2001 | Lin et al. | |
| 6,309,156 B1 | 10/2001 | Schneider | |
| 6,309,158 B1 * | 10/2001 | Bellinghausen et al. | 411/353 |
| 6,311,765 B1 | 11/2001 | Lo et al. | |
| 6,318,452 B1 | 11/2001 | Lee | |
| 6,331,937 B1 * | 12/2001 | Bartyzel | 361/687 |
| 6,379,234 B1 * | 4/2002 | MacKay | 451/359 |
| 6,439,816 B1 * | 8/2002 | Nance et al. | 411/108 |
| 6,473,305 B1 * | 10/2002 | Gordon et al. | 361/704 |
| D472,797 S * | 4/2003 | Ellis et al. | D8/387 |
| 6,545,879 B1 * | 4/2003 | Goodwin | 361/807 |
| 6,549,410 B1 * | 4/2003 | Cohen | 361/704 |
| 6,644,903 B1 * | 11/2003 | Arand | 411/352 |
| D484,031 S * | 12/2003 | Ellis et al. | D8/387 |
| 6,679,666 B2 | 1/2004 | Mizuno et al. | |
| 6,752,577 B2 * | 6/2004 | Chen et al. | 411/508 |
| 6,757,179 B2 * | 6/2004 | Barsun et al. | 361/807 |
| D492,895 S * | 7/2004 | Ellis et al. | D8/387 |
| D494,458 S * | 8/2004 | Aukzemas et al. | D8/387 |
| 6,769,850 B2 * | 8/2004 | Lay | 411/112 |
| 6,786,691 B2 * | 9/2004 | Alden, III | 411/371.2 |
| D496,852 S * | 10/2004 | Gass et al. | D8/387 |
| 6,866,456 B2 * | 3/2005 | Bentrim | 411/353 |
| 6,899,503 B2 * | 5/2005 | Anderson et al. | 411/533 |
| 6,908,276 B2 * | 6/2005 | Dohm | 411/533 |
| 2001/0024607 A1 | 9/2001 | Frattarola | |
| 2002/0026194 A1 * | 2/2002 | Morrison et al. | 606/71 |
| 2003/0007844 A1 * | 1/2003 | Terry | 411/186 |
| 2003/0159819 A1 * | 8/2003 | Lee | 165/185 |
| 2004/0081529 A1 * | 4/2004 | Stanton et al. | 411/44 |
| 2004/0158251 A1 * | 8/2004 | Morrison et al. | 606/71 |
| 2004/0165966 A1 * | 8/2004 | Aukzemas et al. | 411/353 |
| 2006/0146499 A1 * | 7/2006 | Reents | 361/704 |

OTHER PUBLICATIONS

Air Force Qualification Training Package (AFQTP 3E1x1-12) for HVAC/R Module 12 Piping/Tubing, Dec. 2002, pp. 10-12.*
http://www.grainger.com/industrial-supplies/Benders1A217.html.*
http://www.dictionary.com, Definition of "swaging" according to the American Heritage(R) Dictionary of the English Language, 4th ed.*
http://www.dictionary.com, Definition of "flaring" according to the American Heritage(R) Dictionary of the English Language, 4th ed.*
http://www.websters-dictionary-online.net/fl/flaring.html, Definition of "flaring" according to WordNet 1.7.1 Copyright 2001 Princeton University.*
http://www.ridgidforum.com/cgi-bin/ultimatebb.cgi?ubb=get_topic;f=14;t=000062.*
Southco Latches and Access Hardware, North American Addition n-47 NA, pp. C-28 and C-32 (3 pages).
Fairchild Fasteners, Captive Screws, Tridair Products (14 pages).
ITW Fastex, web page www.itw-fastex.com/newprods.htm, Aug. 21, 2001 (2 pages).

ITW Fastex, web page www.itw-fastex.com/cgi-bin/itwfastex/052, Oct. 17, 2002 (1 page).

Photograph of IBM Heat Sink for IBM Xseries 345 Server, p. 1, 2003, 2003 (1 page).

Photograph of Heat Sink Captive Screw by Shuttle, p. 1 and 2, 2003 (2 pages).

Photographs of Swiftech MCX 603 Heat Sink, p. 1 and p. 2, 2002 (2 pages).

Photographs of MSI Hermes 845 GV Heat Sink with Heat Sink Captive Screw installed, p. 1 and 2, and with O-ring, 2002 (3 pages).

Hardcore Cooling, web page www.hardcorecooling.us/product.asp?3=413, p. 1-6 (6 pages).

Fairchild Fasteners, South Bay & Kelkheim Operations, Captive Screws (5 pages).

Captive Fastener Corporation, Self-Clinching Slide-Top Standoffs, Series CFSKC, p. 56 (1 page).

Captive Fastener Corporation, Spring-Top Standoffs, Series CFSSA, CFSSS & CFSSC, p. 59 (1 page).

ITW Fastex, Auto Heatsink Clip, part number 8033-00-9909, Aug. 15, 2000 (1 page).

* cited by examiner

CAPTIVE SHOULDER NUT HAVING SPRING TIE-DOWN

BACKGROUND OF THE INVENTION

In assembling electronic components and modules, inserts, spacers and standoffs have been often used. The attachment of components and parts has been accomplished by screws, spring clips, clamps and other such devices. In a chassis for holding electronic components, space for the manual manipulation of parts and tools often is an issue.

Captive screws and captive fasteners are devices used to fasten two components together, where the fastener remains with one of the components when loosened. Typically a captive screw is "caught" by the component it remains with by a flange, a ferrule, a spring clip or the like, which structure prevents the total removal of the captive fastener from that component. The usefulness of captive fasteners is that they do not get lost or fall out of the associated component before and during assembly.

This feature has become very useful in the assembly and removal of components associated from electronic module boards, peripheral component interconnect boards (PCI boards), and printed circuit boards (PC boards), and in the environment of the chassis for housing these boards.

Modern large scale integrated (LSI) circuits, microprocessors, microchips and other integrated circuit devices (IC chips) generate a substantial amount of heat, especially when operating at very high frequencies. Such heat generation can amount to 10's of watts and even 100's of watts of heat per hour. It has become imperative to mount heat sinks on these IC chips to dissipate as much heat as possible. In such instances the heat sink is mounted to the board or to a mounting frame which in turn is mounted to the board on which the IC chip is also mounted.

Spring clips have been used to hold heat sinks to IC chips on PC boards. However, these clips are sensitive to vibration, often interfere with the heat transfer fins on the heat sink and are often hard to positively snap into place and to release.

Captive screws have provided and improvement over heat sink clips. Two or four captive screws are used and engage respective flanged corners of a heat sink. These captive screws have threaded ends which usually engage a threaded ferrule or threaded bushing mounted into a hole through the PC board. They also require a ferrule or bushing though the heat sink's flange through which they extend.

A captive screw may use a slip ring, annular flange, or projecting shoulder positioned on the captive screw at a location below the heat sink flange's surface. This projecting structure prohibits the captive screw from being withdrawn out of the heat sink and thereby holds the fastener captive on the heat sink. Captive screws are generally driven (tightened and loosened) by tool engagement with their head. Typically, captive screws have Phillips, slotted, or TORX heads requiring appropriate screw drivers.

Oftentimes a sheet of compressible elastomeric heat transfer polymeric material is used between the top surface of the IC chip and the bottom of the heat sink. This heat transfer interface material takes up for any surface irregularities in the mating IC chip and heat sink.

Captive screws for IC chip heat sinks with heat transfer polymeric sheeting have incorporated spring tie-down designs where the tie-down force exerted by the captive screw is governed by the spring force of a compresses spring. This structure permits the heat sink to "float", i.e., move through expansion and contraction as the IC chip temperature changes.

As the chassis for electronic modules is made smaller with a smaller foot print, and as more boards are crowded into tightly spaced racks in a chassis, the size and position of heat sink tie-down screws, including captive screws, becomes an issue. Moreover, Phillips, slotted and even TORX heads can round out with poor tool alignment. The use and installation of board mounted receiving threaded bushings or ferrules and of heat sink mounted ferrules adds to the cost of the securement hardware. Alignment of the heat sink assembly when aligning the heat sink screws with the board mounted receiving threaded bushing or ferrules generally requires two hands and some lateral movement. This lateral movement can jeopardize the integrity of the printed circuit coating on the board, and miss-align the interface polymer heat transfer pad. This makes the removal and reinstallation of heat sinks in tight quarters difficult.

To improve the ease of alignment of a heat sink and to assure proper positioning thereof, permanent board mounted studs have been proposed. These studs can be threaded for securing a fastener thereto and can also act as alignment pins during the removal and the reinstallation of a heat sink. What is desired is a nut-type structure for use with board mounted studs for securing a heat sink to an IC chip.

The objective of the present invention is to provide a captive nut structure for use with IC chip heat sinks, which captive nut structure remains with the heat sink when it is removed.

A second objective is to provide spring tie-down which will permit the heat sink to float with temperature changes.

A third objective is to minimize the manufacturing costs of the captive nut structure and to minimize the number of components thereof

SUMMARY OF THE INVENTION

The objectives of the present invention are realized in a heat sink nut assembly that is captive to the heat sink. This nut assembly includes a spring for exerting a tie-down force on the heat sink, and also includes an enlarged section to captivate it to the heat sink.

While this nut assembly was designed for heat sinks for PCI and PC board electronic components and modules, it is equally applied to holding other structures.

The nut assembly includes a threaded hexagonal nut portion and a tubular portion extending therefrom. A ramped section, adjacent to the tubular portion's connection to the nut portion, flares outwardly as it approaches the nut portion, and is terminated to form an annular shoulder thereby establishing a retaining groove in the tubular portion adjacent the nut portion.

A compression spring has its ends each formed into a flat circular loop. The inside diameter of the compression spring is large enough to slide over the tubular portion. The upper end of the spring is slid over the ramped section to be retained in the retaining groove.

An advantage of the present invention is that it permits the use of threaded studs to hold the heat sink. The previous male screw is eliminated. Therefore, the studs act as a locator and alignment means for assembly, and the possibility of damage to the PC board due to a male screw is eliminated. The present invention has fewer parts than a captive screw assembly. The ferrule and/or threaded bushing are eliminated. The structure takes up less space (has a smaller footprint) than a captive screw with a ferrule. This permits more space on a heat sink base pad for fin area.

The assembly of the nut and spring is slipped though a straight hole in the flange of the heat sink. The spring, which will not pass through the hole, extends between the bottom of the nut portion of the assembly and to top face of the heat sink flange. The assembly is then compressed and the free end of the tubular portion is flared over to extend outwardly greater than the hole size. A special flaring tool may be required to repeat the same final end diameter on each tubular portion of a new captive nut assembly.

The flared end acts to captivate the nut assembly, as well as to provide a shoulder stop to provide the correct spring force. When a heat sink carrying the captive nut assemblies is mounted onto a PCI board or a PC board, the flared end provides a stop against the board to establish a correct spring force hold down on the flanges of the heat sink. The springs also permit the heat sink to float with temperature affected changes in dimensions.

BRIEF DESCRIPTION OF THE DRAWINGS

The features, advantage and operation of the present invention will become readily apparent and further understood from a reading of the following detailed description with the accompanying drawings, in which like numerals refer to like elements, and in which.

DETAILED DESCRIPTION OF THE INVENTION

Figure 1:
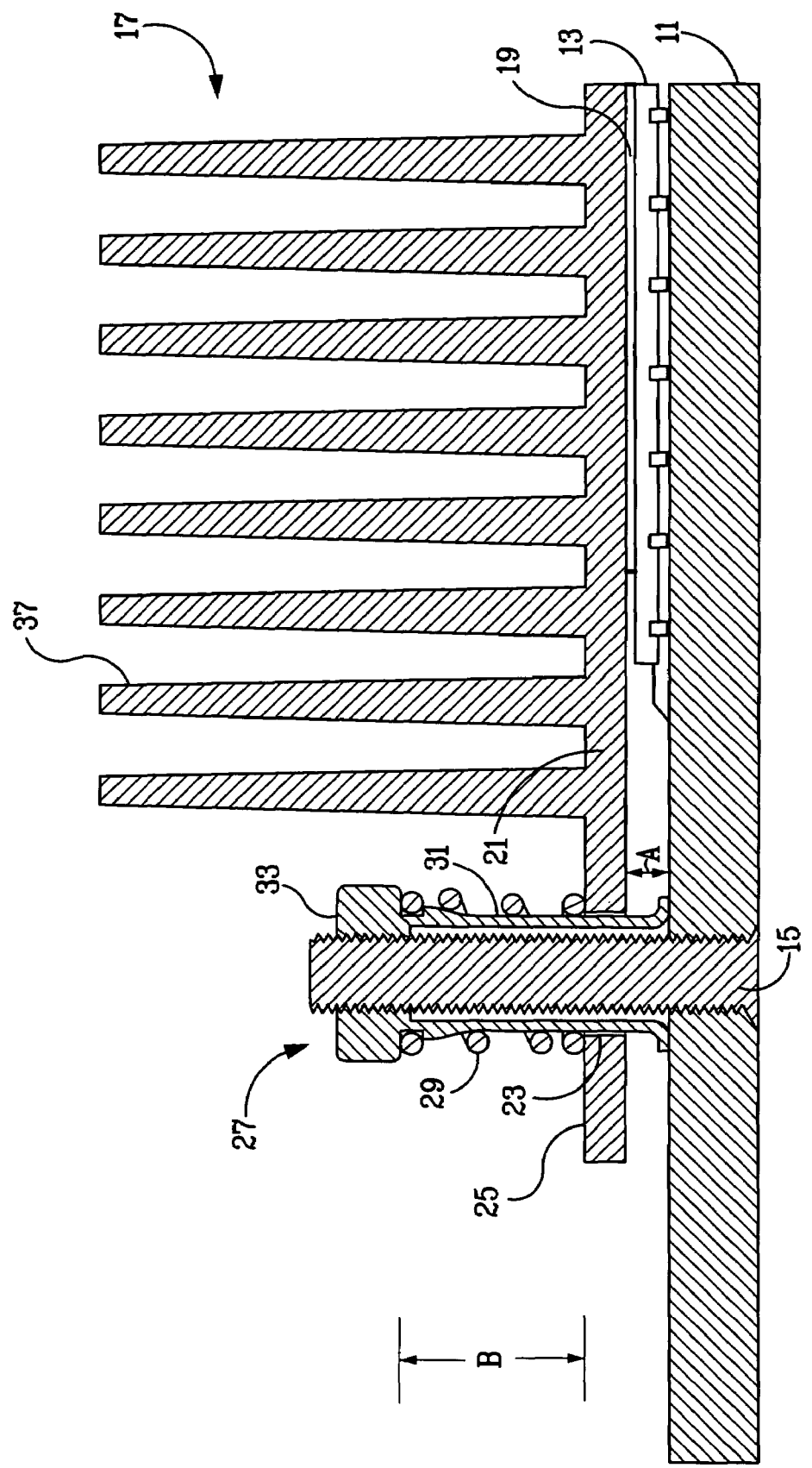
FIG. 1 is a side elevation cross-section of the captive nut assembly holding a heat sink to a PC board.

The present invention is a captive shoulder nut assembly having a spring tie-down for mating with a stud on a PCI board (peripheral component interconnect board) or a PC board (printed circuit board) for holding a heat sink to an IC device (integrated circuit device or microchip) or other electronic module. A PC board 11, FIG. 1, has a microchip, integrated circuit (IC) 13 mounted to the surface thereof. A plurality of threaded studs 15 are mounted to the PC board 11 to be upstanding about the periphery of the IC 13. These studs 15 are usually two or four, and are used for mounting a heat sink 17 to the board 11 over and in contact with the IC 13.

Integrated circuit 13 carries a heat transfer compressible interface pad 19 on the top surface thereof for mating with the heat sink base plate 21 and for taking up for any irregularities in the base plate 21 or the top surface of the IC 13.

Straight holes 23 extend through the flanges 25 which extend about the periphery of the base plate 21. Each hole 23 is to be mated to an outwardly extending stud 15. The studs 15 act as positioning pins when mounting the heat sink 17 to the board 11 and over the IC 13.

Each captive shoulder nut assembly 27 is screwed onto a stud 15 to tie-down the flange 25 with the force of a compressed spring 29 carried thereon. The tie-down force exerted on the flange 25 by the spring 29 is affected by the stand-off distance "A" and the resultant compressed length "B" of the spring 29. A tubular sleeve 31 is connected to a threaded nut 33 which is tightened down onto the stud 15 thereby driving the sleeve 31 into contact with the top surface of the PC board 11. The free end of the sleeve 31 is flared outwardly 35 to a larger diameter than the hole 23. This flared free end 35 captivates the sleeve 31, the spring 29 and the nut 33 to the flange 25 of the heat sink 17. The flared end 35 also forms a stop against the PC board 11 top surface.

The narrow profile (small footprint) of the captive nut assembly 27 permits a smaller flange 25 than previously thereby yielding a larger area for heat sink fins 37. The upper end of the spring 29 is held to the nut 33 and sleeve 31 at a retaining groove described below.

Figure 2:
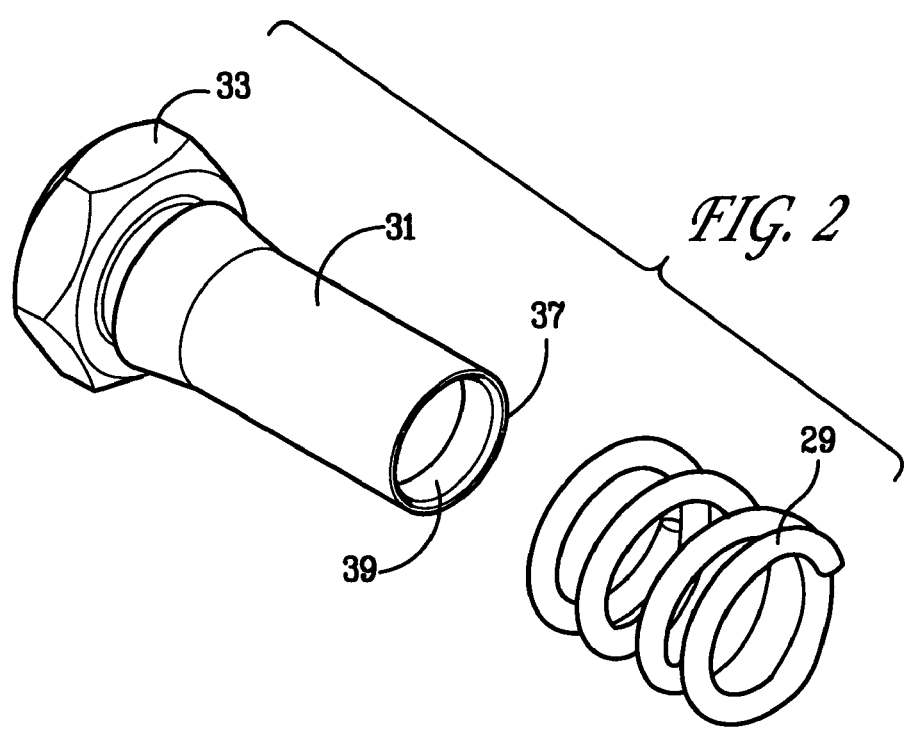
FIG. 2 is an exploded perspective assembly view of the captive nut assembly prior to installation and flaring.

The captive shoulder nut assembly prior to installation on a heat sink or other device is shown in FIG. 2. The assembly has two components. The first component is the nut 33 and tubular sleeve 31 extending from one face thereof. The second component is the spring 29. The nut 33 and sleeve 31 are made as one machined component. However, alternately, a shoulder nut may have a tubular sleeve pressed on or crimped on a projecting barrel-like shoulder on the nut. This would permit the nut and sleeve to be made of two dissimilar materials.

The nut 33 and sleeve 31, FIG. 2, are machined from a single stock material, which may be made of type 304 stainless steel, or of brass or bronze or alloys of any of these. The spring 29, FIG. 2, may be made of type 302 stainless steel or of spring wire.

Figure 3:
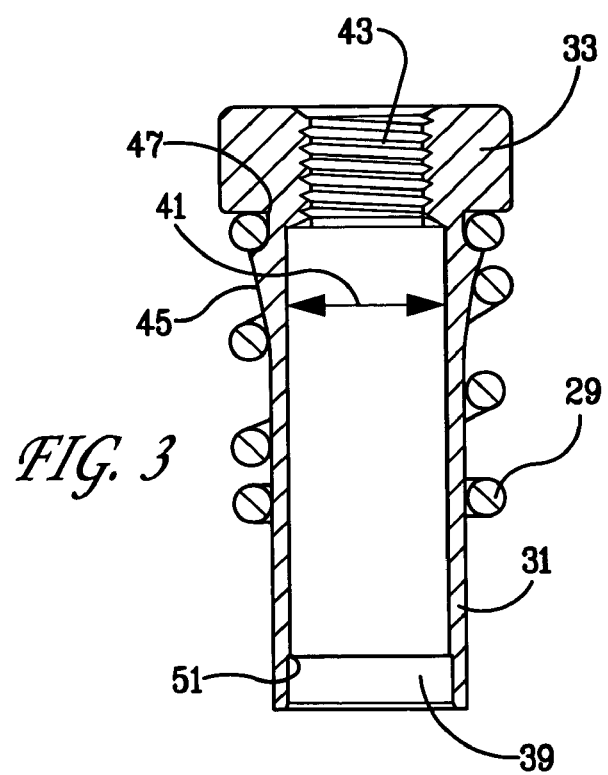
FIG. 3 is a longitudinal cross-sectional view of the captive nut assembly with the spring assembled on the retaining groove.
Figure 4C:
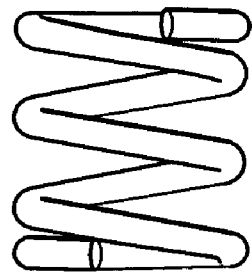
FIG. 4c is a second side view of the spring take at a 90 degree rotation from the first side view.
Figure 4E:
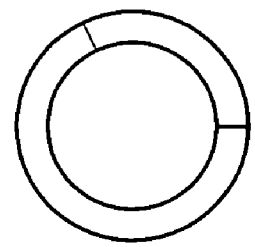
FIG. 4e is an opposite end view of the spring.
Figure 4B:
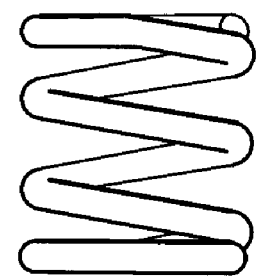
FIG. 4b is a first side view of the spring.
Figure 4D:
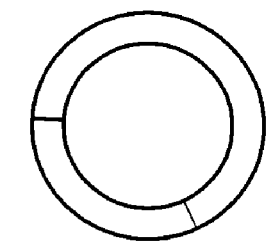
FIG. 4d is a first end view of the spring.
Figure 4A:
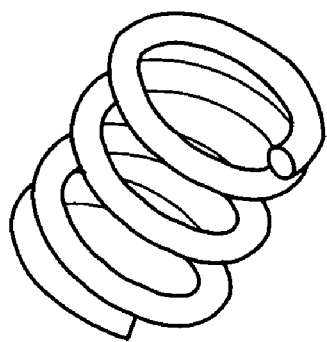
FIG. 4a is a perspective view of the spring.

The free end 37 of the sleeve is chamfered 37 and then has a section of its interior wall which undercut into a counter sunk bore 39. The undercut of the counter sunk bore 39 creates a thinner wall thickness in the region of the sleeve 31 to be flared out. The counter sunk bore 39 terminates in the shoulder 51, shown in FIG. 2 and FIG. 3. This shoulder 51 is the transition between the counter sunk bore 39 section and the other portion of the tubular sleeve 31. FIG. 3 shows a longitudinal cross-section of the assembled components of FIG. 2. As seen, the inside diameter 41 of the tubular sleeve portion 31 is sufficiently large to pass over the stud 15. Only the nut 33 is threaded 43. The inside diameter 41 of the tubular sleeve portion 31 is shown to increase only in the undercut bore section 39 after the shoulder 51. Also shown in FIG. 3 are a ramped section 45 and a retaining groove 47, which are discussed below. The external wall of the tubular sleeve 31 below the ramped section 45 remains a uniform cylindrical wall as shown in FIGS. 2 and 3.

FIGS. 4a through 4e show various views of the shape of the compression spring 29, which is helically wound with flat circular ends. FIGS. 5a through 5d show various views of the nut 33 and counter sunk tubular sleeve 31. A ramped section 45 in the exterior wall of the tubular sleeve 31 leads to a retaining groove 47 adjacent the bottom face of the nut, FIGS. 3, 5a and 5b. The length of the retaining groove 47 is slightly larger that the diameter of the wire from which the spring 29 is constructed. The depth of the retaining groove 47 is sufficient to hold the end circular loop of the spring 29, FIG. 3.

Figure 5B:
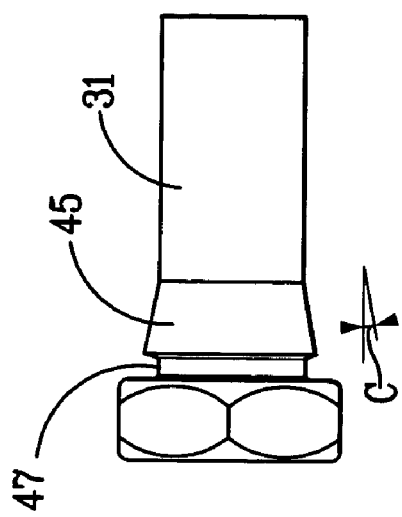
FIG. 5b is a side view of the nut and tubular members.
Figure 5D:
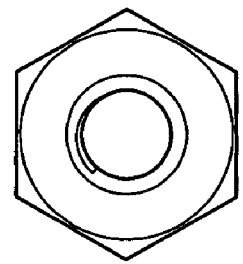
FIG. 5d is a nut member end view of FIGS. 5a and 5b.
Figure 5A:
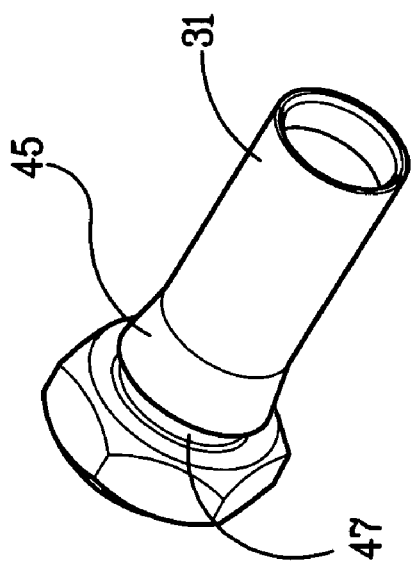
FIG. 5a is a perspective view of the nut and tubular members.
Figure 5C:
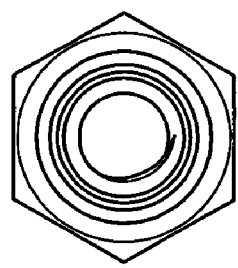
FIG. 5c is a tubular member end view of FIGS. 5a and 5b.

The angle "C", FIG. 5b, of the ramped section 45 is sufficient to spread the end of the spring 29 in order to position it into the retaining grove 47. Angle "C" can be about 10 degrees. The ramped section 45, FIGS. 2, 3, 5A, 5B, 6 and 7, extends increasingly linearly outwardly about the cylindrically shaped tubular sleeve 31 as it approaches the bottom of the nut 33 and the groove 47. As seen, the ramped section 45 is frustoconical in shape, i.e., the shape of a truncated cone. The conical wall surface of this ramped section 45 extends furthest outwardly, i.e., has the largest diameter, in the direction of the groove 47 whereupon it truncates at the groove 47, FIGS. 5A, 5B so that the groove extends on the outer wall of the tubular sleeve 31 between the truncated end of the ramped section 47 and the bottom of the nut 33.

The captive shoulder nut assembly is captivated onto a heat sink 17 with the following steps. The spring 29 is slid onto the sleeve 31 with its leading end pushed over the ramped section 45 and into the retaining groove 47. This assembly is then inserted though a hole 23 in a heat sink to partially compress the spring 29 and permit the leading end of the sleeve 31 to project below the flange 25 of the heat sink sufficiently for a flaring tool to grasp the sleeve 31 above the end of the counter sunk section 39. The flaring tool then flares out the counter sunk section 39 to a diameter greater than the diameter of the hole 23. The heat sink is then mounted on the studs 15 and the nut 33 is tightened until the flared free end of the sleeve 31 stops against the top surface of the PC board, FIG. 1.

Figure 7:
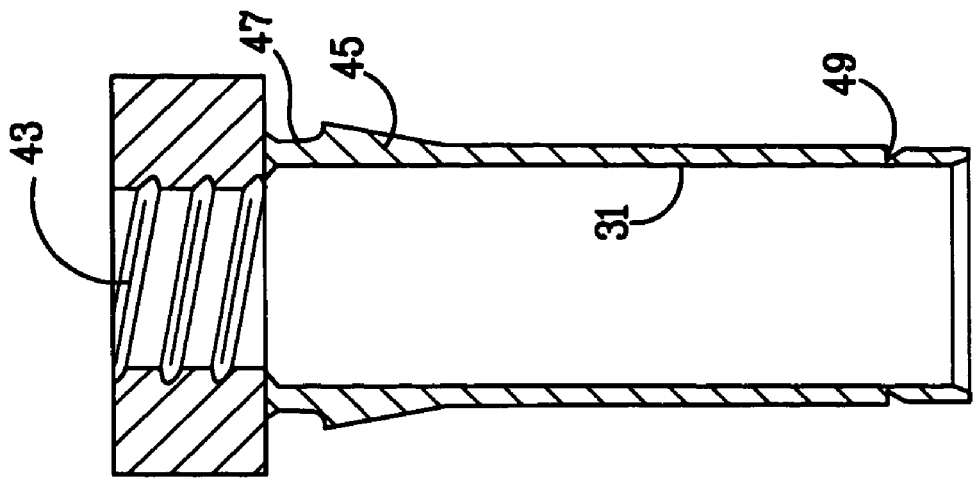
FIG. 7 is a cross-sectional view of the t alternate embodiment of FIG. 6.
Figure 6:
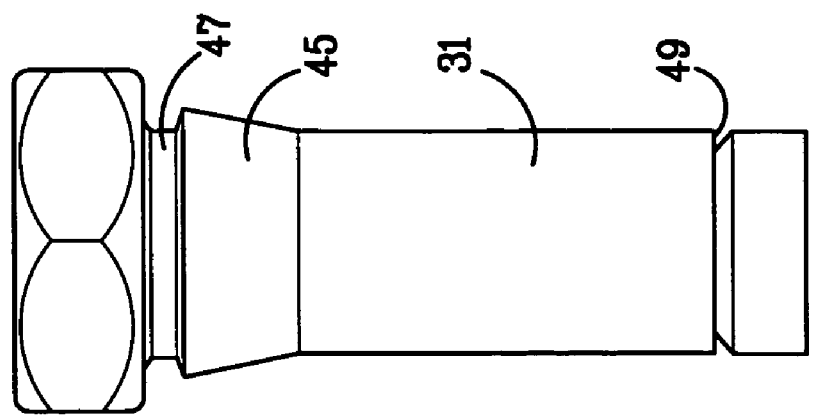
FIG. 6. is a side view for a alternate embodiment for FIG. 5b where the tubular member has an annular relief groove adjacent the free end thereof.

As an alternative to the under cut or counter sunk section 39 in the sleeve 31, an external groove 49 can be cut in the external surface of the free end of the sleeve 31, FIGS. 6 and 7. This external annular groove 49 can be V-shaped. During the flaring operation of the assembly steps, the flaring tool is clamped inboard of the V-groove 49 and the wall of the sleeve 31 is flared outwardly.

Many changes can be made in the above-described invention without departing from the intent and scope thereof. It is therefore intended that the above description be read in the illustrative sense and not in the limiting sense. Substitutions and changes can be made while still being within the scope and intent of the invention and of the appended claims.

What is claimed is:

1. A captive shoulder nut assembly, comprising:
   a threaded nut having a top side and a bottom side;
   a tubular sleeve connected to and extending from said threaded nut bottom side;
   a ramped section on the external wall of the tubular sleeve terminating adjacent said nut bottom, said ramped section increasing outwardly as it extends in the direction towards said nut bottom side;
   a retaining groove in the external wall surface of said tubular sleeve formed between said termination of said ramped section and said nut bottom side; and
   a spring mountable on said tubular sleeve and secured within said retaining groove;
   wherein said sleeve also has a portion extending from said ramped section to its free end, and wherein the free end of said tubular sleeve opposite said nut connection end is deformably flared to extend beyond said tubular sleeve when said sleeve is fixed in an object.

2. The captive shoulder nut assembly of claim 1, wherein the free end of said tubular sleeve has an internal counter sunk section extending thereinto towards said nut, said tubular sleeve counter sunk section having a larger inside diameter and a thinner wall than the remainder of said tubular sleeve.

3. The captive shoulder nut assembly of claim 2, wherein said ramped section outward increase is linear outward about said sleeve.

4. The captive shoulder nut assembly of claim 3 wherein said ramped section is shaped to slidably receive said spring, and wherein said spring is a coil-type spring whereof an individual coil of said spring is expanded as said spring is slid onto said ramped section, said expanded coil be suitable to snap into said retaining groove.

5. The captive shoulder nut assembly of claim 4, also including a shoulder at said counter sunk section transition to said remainder of said tubular sleeve.

6. The captive shoulder nut assembly of claim 5, wherein said threaded nut and said tubular sleeve are of one continuous material.

7. The captive shoulder nut assembly of claim 5, wherein said threaded nut and said tubular sleeve are of two dissimilar materials, said tubular sleeve being secured to said threaded nut.

8. The captive shoulder nut assembly of claim 3 wherein said ramped section forms a truncated conical surface.

9. The captive shoulder nut assembly of claim 1, wherein said tubular sleeve also includes an annular groove in its external wall surface at a position inward and from the free end of said tubular sleeve.

10. A method of assembling a captive shoulder nut assembly through a straight hole in a plate, comprising the steps of:
    providing a nut with a tubular sleeve connected on one end to and extending from said nut, said sleeve having an opposite free end, and having an external ramping section located inward from the free end thereof and increasing linearly outwardly and truncating proximate said nut end of said sleeve;
    forming a retaining groove proximate said nut end of said sleeve between said truncation of said ramping section and said nut,
    forming an annular external groove on said tubular sleeve proximate said free end of said sleeve;
    mounting a compression spring around the tubular sleeve by sliding the spring toward the nut and onto said ramping section to expand a coil thereof and thereafter snap said expanded coil into said formed retaining groove;
    passing the tubular sleeve through said hole in the plate, which hole has a diameter which is smaller than the inside diameter of the compression spring;
    depressing the spring so that the free end of the tubular sleeve extends beyond the hole, and
    flaring the free end of the tubular sleeve from said external groove to outwardly deform said tubular sleeve free end to a diameter larger than the hole to captivate the nut and tubular sleeve to the plate.

11. A captive nut assembly attachable through a hole in a captivating plate, comprising:
    a nut member, having an interior opening;
    a cylindrical walled sleeve member, attached to said nut member and extending from one face thereof in alignment with the interior opening thereof and terminating in a free end;

a ramped section on an external wall of said sleeve member, said ramped section outwardly increasing as it extends towards said nut member;

a retaining groove on the external wall of said sleeve member formed between said nut member and said ramped section; and a spring member mounted on the outside of the exterior wall of said sleeve member and secured by the retaining groove;

wherein said sleeve also has a portion extending from said ramped section to its free end, and wherein the free end of the sleeve member is deformably flared with a flaring tool when said sleeve free end is fixed in an object.

12. The captive nut assembly of claim 11, wherein said ramped section includes a ramped wall which extends outwardly in a linear manner about said sleeve member.

13. The captive nut assembly of claim 12, wherein said free end of said sleeve member has an interior undercut counter sunk bore there into providing a thinner outer wall section from said free end there into.

14. The captive nut assembly of claim 13, wherein said sleeve member free end is flarable once extended through said captivating plate hole, said flaring thereby captivating said sleeve member, wherein said captivating of said sleeve member also captivates said connected nut member and said spring member.

15. The captive nut assembly of claim 12, wherein adjacent said free end of said sleeve member, said sleeve member carries an external annular groove, said sleeve member being flared deformable from said external groove.

16. The captive nut assembly of claim 15, wherein said sleeve member external annular groove is a V-shaped groove.

17. The captive nut assembly of claim 15, wherein said sleeve member free end is flarable once extended through said captivating plate hole, said flaring thereby captivating said sleeve member, wherein said captivating of said sleeve member also captivates said connected nut member and said spring member.

18. A captive fastener assembly, comprising:

a fastener;

a tubular sleeve connected at one end to a portion of said fastener, said tubular sleeve having a free end at the opposite end from said connection end;

a ramped section on the external wall of the tubular sleeve, said ramped section ramping outwardly in the direction of said connection end;

a retaining groove in an external wall surface of said tubular sleeve between said ramped section and said tubular sleeve connection end; and a compression spring mountable on said tubular sleeve and securable within said retaining groove;

wherein said tubular sleeve has a portion extending from said ramped section to its free end, and wherein the free end of said tubular sleeve is deformably flared to extend beyond said tubular sleeve when said sleeve is fixed in an object.

19. The captive fastener assembly of claim 18, wherein the free end of said tubular sleeve has an internal counter sunk section extending thereinto, said tubular sleeve counter sunk section having a larger inside diameter and a thinner wall than the remainder of said tubular sleeve.

20. The captive fastener assembly of claim 19, wherein said ramped section outward ramp increase is linear.

21. The captive fastener assembly of claim 20, wherein said ramped section forms a truncated conical surface.

22. The captive fastener assembly of claim 19, wherein said ramped section is shaped to slidably receive said compression spring, and wherein an individual coil of said compression spring is expanded as said spring is slid onto said ramped section, said expanded coil is suitable to snap into said retaining groove.

23. The captive fastener assembly of claim 18, wherein said tubular sleeve also includes an annular groove in its external wall surface inward from the free end of said tubular sleeve.

* * * * *

UNITED STATES PATENT AND TRADEMARK OFFICE
CERTIFICATE OF CORRECTION

PATENT NO. : 7,344,345 B2
APPLICATION NO. : 10/855538
DATED : March 18, 2008
INVENTOR(S) : Thomas V. Aukzemas Page 1 of 1

It is certified that error appears in the above-identified patent and that said Letters Patent is hereby corrected as shown below:

Title page, Item [57] Abstract, line 1, replace "a" with --an--;
Column 1, line 42, replace "provided and improvement" with --provided an improvement--;
Column 1, line 67, replace "compresses" with --compression--;
Column 2, line 35, insert --.-- (period) after "thereof";
Column 3, line 6, replace "to top" with --the top--;
Column 3, line 37, replace "take" with --taken--;
Column 3, line 46, replace "a alternate" with --an alternate--;
Column 5, line 26, replace "though" with --through--;
Column 6, line 14, replace "be suitable" with --is suitable--;
Column 6, line 30, replace "inward and from" with --inward from--.

Signed and Sealed this

Twenty-eighth Day of July, 2009

JOHN DOLL
*Acting Director of the United States Patent and Trademark Office*